Figure 1:
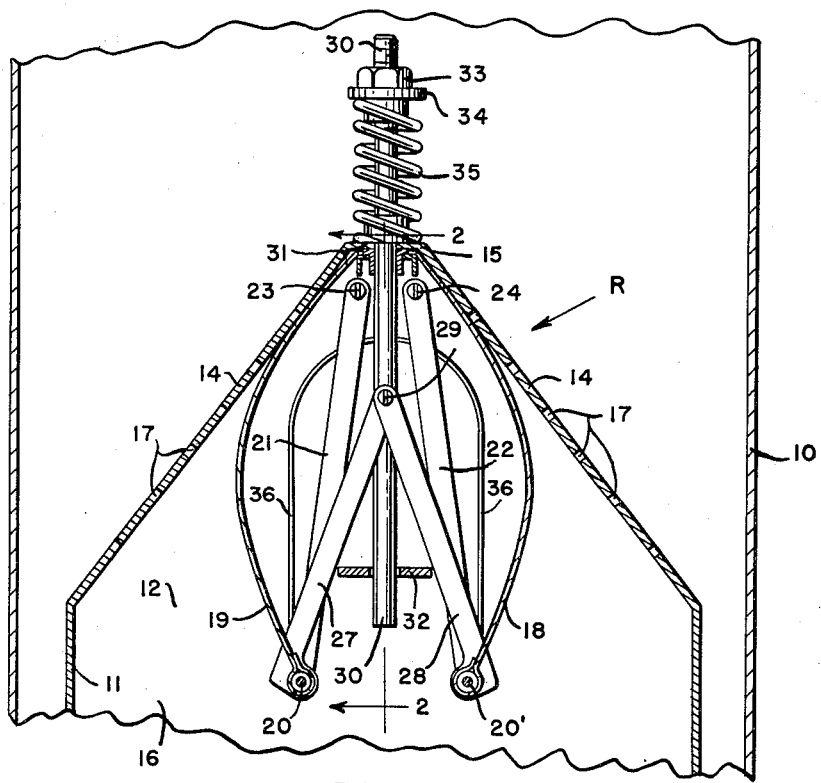

Sept. 11, 1962  R. W. WATERFILL  3,053,275
FLEXIBLE CURTAIN CONTROL VALVE
Filed July 20, 1959

INVENTOR.
ROBERT W. WATERFILL
BY
Pollard Johnston Suy the Robertson
ATTORNEYS

United States Patent Office 3,053,275
Patented Sept. 11, 1962

3,053,275
FLEXIBLE CURTAIN CONTROL VALVE
Robert W. Waterfill, Montclair, N.J., assignor, by mesne assignments, to Buensod-Stacey Corporation, a corporation of Ohio
Filed July 20, 1959, Ser. No. 828,334
4 Claims. (Cl. 137—512.1)

The present invention relates to fluid flow control devices and particularly to an arrangement for stabilizing the action of a fluid flow control valve by employing oppositely acting resilient means that is instantly responsive to any sudden change of fluid pressure and which resilient means tends to oppose flutter or hunting of the fluid control valve.

It is well known that variations of fluid pressure in a fluid distribution line or duct may result in an inconstant or varying rate of flow. In air conditioning systems, particularly those employing a central air conditioning apparatus from which air is delivered to a plurality of individual distributing units, pressure variations in the air delivery line or ducts occur frequently by reason of the irregular and changing demand for air in the rooms or zones being conditioned. Variations of pressure within the ducts tend to cause objectionable changes in air distribution, noises due to valve flutter, and other undesirable effects.

Various types of air flow or volume control regulators have been employed in such systems in order to maintain substantially constant the rate of flow of air from a regulator to a room or zone being conditioned. Certain types of these flow control regulators involve the use of flexible curtain devices that are adapted to cooperate with rigid, motion limiting means having fluid flow passage means therein. The flexible curtain means may be resiliently urged into a position for providing predetermined flow conditions for a given requirement. In the event there occurs a sudden increase or decrease in pressure or volume of flow upstream from the regulator, the flexible curtain means is moved into or away from the motion limiting means, thereby decreasing or increasing the effectiveness of the fluid flow passage means so as to maintain substantially constant the flow of fluid to the room or zone being conditioned.

Sudden increases or decreases in pressure or volume flow often occur in a periodic fashion, causing a hunting or fluttering action of the flexible curtain means, thereby tending to defeat the purpose for which the flow control regulator was designed, i.e., constant flow of conditioned air; and to produce objectionable flutter noises within the system.

A principal object of this invention is to provide an anti-hunting and flutter-resisting fluid flow control regulator which will be sensitive to pressure and volume fluctuations within an air conditioning system.

Another object of the invention is to provide such a fluid flow control regulator in which a flexible curtain means responds to variations in pressure and fluid flow to maintain substantially constant the flow of conditioned air to a room or zone being conditioned.

Another object of the invention is to provide a flexible curtain fluid flow regulator in which opposing resilient means normally maintains a predetermined fluid flow past the curtain.

Another object of this invention is to provide such a flexible curtain fluid flow regulator in which the opposing resilient means tends to resist any movement of the curtain means due to sudden variations of fluid pressure acting thereon.

Another object of the invention is to provide such a fluid flow regulator in which the opposing resilient means increases the sensitivity or control of the flow regulator.

While the present invention can be employed in conjunction with low-pressure systems, it is particularly useful when it is employed with high-pressure arrangements.

In one aspect of the invention, a duct leading to a room or zone to be conditioned may be provided with a flow control regulator of the pressure sensitive type including a housing having walls that include fluid passage means such as perforations or the like, and a flexible curtain means normally adapted to be held away from the walls to permit a predetermined flow of fluid therethrough.

Increases and decreases of the pressure within the duct on the upstream side of the regulator cause movement of the flexible curtain means relatively to the perforated walls to prevent variation of the flow of fluid through the regulator.

In another aspect of the invention, the curtain operating means may include a reciprocable rod connected to the flexible curtain means by a linkage, and resilient, adjustable means may act on the rod to vary the action of the curtain means incident to variations in pressure on the upstream side of the regulator.

In another aspect of the invention, another resilient means may act on the linkage connected to the curtain means but in opposition to, and with less force than the resilient adjustable means. The combined effect of these two resilient means tends to resist movements of the curtain means incident to sudden changes in fluid pressure acting on the curtain means. Additionally, the presence of these opposing forces at all times increases the sensitivity of the control by reducing slack within the linkage system, and providing a steady force against which the control resilient means works, thereby minimizing slight changes or pulsations which occur in the fluid stream.

In still another aspect of the invention, the adjustable volume control resilient means and the opposing resilient means may be springs of different design and having widely separated frequencies so as to avoid any harmonic vibrations being set up between them. In this regard, one of the springs may be a coil spring and the other an elongated leaf spring.

The above as well as other objects and novel features of the invention will become apparent from the following specification and accompanying drawing which is merely exemplary.

Figure 2:
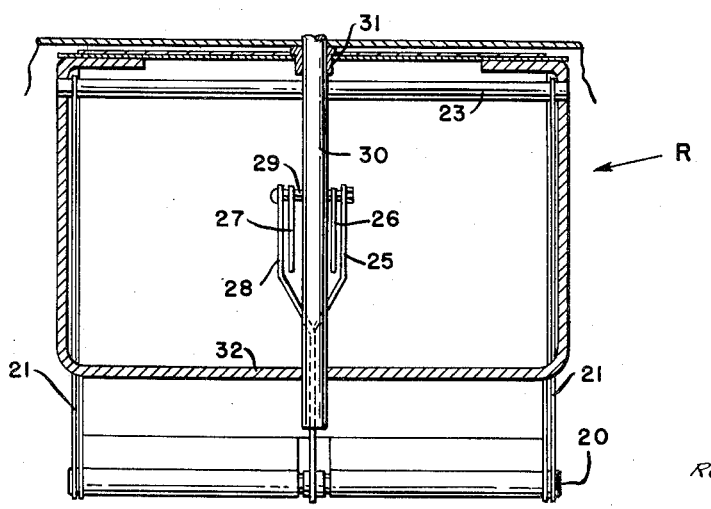

In the drawing:

FIG. 1 is a sectional elevational view of a fluid flow regulator to which the principles of the invention have been applied; and FIG. 2 is a sectional elevational view taken substantially along line 2—2 of FIG. 1.

Referring to the drawing, the principles of the invention are shown as applied to a regulator R located within a duct 10 so that all of the fluid within the duct 10 must pass through it prior to reaching a room or zone to be conditioned.

The regulator R may include a housing 11 having impervious end walls 12, and they may include pitched portions 14 that are joined by a crown 15 forming a roofed housing having its upstream end open at 16 to the fluid within duct 10. The pitched portions 14 may be provided with fluid passage means, and in the embodiment disclosed, this means comprises perforations 17.

Flexible curtain means 18 and 19 may be fixed along its downstream edge to the housing 11 at the juncture of the portions 14 and the crown 15 in a manner such that the curtain means 18 and 19 may pivot and progressively cover more and more of the perforations 17 when the upstream side of the means 18 and 19 is subjected to increasing upstream pressure.

The ends of the curtain means 18 and 19 opposite those fixed to the crown 15 may be fixed to rods 20 and 20' extending throughout the dimension of the housing 11 in a direction at right angles to the paper. Two pairs of links 21 and 22 may have their one ends pivoted to the end walls 12 at 23 and 24, while their opposite ends may be connected to the rods 20 and 20', respectively. Two pairs of links 25, 26 and 27, 28 may have their one ends connected to the rods 20 and 20', respectively, and their other ends pivotally connected to a pin 29 extending through a reciprocable rod 30.

The rod 30 may extend upwardly through a slide bearing 31 mounted on the outside of crown 15 of the housing 11. Rod 30 may extend downwardly through a guide bearing within a bracket 32 that is parallel with crown 15 and extends between end walls 12. The upper end of rod 30 may be threaded to receive a nut 33 and a washer 34. A compression spring 35 may surround rod 30 and lie between washer 34 and the top of bearing 31. The construction may be such that a predetermined compression of spring 35 may urge rod 30 upwardly, tending to collapse the linkage and curtain means 18 and 19 so that maximum fluid flow will pass through the apertures 17.

From the foregoing it is evident that variations in pressure on the upstream side of the regulator R will cause movement of the curtain means 18 and 19 toward and away from the perforated walls 14 to progressively cover and uncover the apertures 17, all for the purpose of maintaining a substantially uniform flow of fluid to the room or zone being conditioned.

In order to prevent hunting and fluttering of the curtain means 18 and 19 when the upstream pressure varies periodically, damping means may be provided which arts to resist any rapid change of condition of the curtain means 18 and 19. While this dampening means may take various forms and be responsive to the movement of any of the movable elements associated with the curtain means, it is shown in FIGS. 1 and 2 as being in the form of a relatively long leaf spring 36. The leaf spring 36 may be relatively light compared with the spring 35, and may extend from the one rod 20 vertically upwardly within the space defined by the flexible curtain means 18, 19; thence it may define an arcuate or semicircular path and extend vertically downwardly to the rod 20'. In this way the spring 36 may be relatively long and hence have a period of vibration substantially different from that of the coil spring 35.

With the parts in the condition shown in FIG. 1, the leaf spring 36 is flexed in a manner to cause a resilient force to be exerted on the rods 20 and 20' tending to separate them, while the spring 35 which is much stronger than spring 36 tends to raise rod 30 and hence draw the rods 20 and 20' together. Accordingly, the spring 35 at all times has an opposing force to work against due to leaf spring 36 which tends to minimize slight changes or pulsations which occur in the fluid stream. Additionally, by virtue of the relatively long, light leaf spring 36 and the relatively strong coil spring 35, the frequencies of the two springs are far enough apart to avoid one following the other in any pulsations of the curtain means 18, 19.

Although the various features of the new and improved anti-hunting and anti-flutter regulator have been shown and described in detail to fully disclose one embodiment of the invention, it will be evident that numerous changes may be made in such details, certain features may be used without others without departing from the principles of the invention, and that they can be used on various types of volume regulators.

What is claimed is:

1. In a fluid flow control regulator, a frame having walls defining a chamber, certain of said walls having fluid passage means through which fluid is adapted to pass in flowing to a room or zone being conditioned; separate flexible curtain means pivotally connected at one edge to each of said certain walls and responsive to upstream pressure variations for progressively varying the effectiveness of said fluid passage means; linkage means connected to the other edges of said separate curtain means; presettable means connected to said linkage for maintaining said separate curtain means in a predetermined position relatively to its corresponding certain wall to provide a predetermined effectiveness of the fluid passage means therein; and a prestressed leaf spring extending between the connections of said linkage and said other edges of said separate curtain means.

2. In a fluid flow control regulator, a frame having walls defining a chamber, certain of said walls having fluid passage means through which fluid is adapted to pass in flowing to a room or zone being conditioned; separate flexible curtain means pivotally connected at one edge to each of said certain walls and responsive to upstream pressure variations for progressively varying the effectiveness of said fluid passage means; linkage means connected to the other edges of said separate curtain means; presettable means connected to said linkage for maintaining said separate curtain means in a predetermined position relatively to its corresponding certain wall to provide a predetermined effectiveness of the fluid passage means therein; and a relatively long, prestressed leaf spring extending between the connections of said linkage and said other edges of said separate curtain means.

3. In a fluid flow control regulator, a frame having walls defining a chamber, certain of said walls having fluid passage means through which fluid is adapted to pass in flowing to a room or zone being conditioned; separate flexible curtain means pivotally connected at one edge to each of said certain walls and responsive to upstream pressure variations for progressively varying the effectiveness of said fluid passage means; linkage means connected to the other edges of said separate curtain means; a presettable coil spring connected to said linkage for maintaining said separate curtain means in a predetermined position relatively to its corresponding certain wall to provide a predetermined effectiveness of the fluid passage means therein; and a prestressed leaf spring extending between the connections of said linkage and said other edges of said separate curtain means.

4. In a fluid flow control regulator, a frame having walls defining a chamber, certain of said walls having fluid passage means through which fluid is adapted to pass in flowing to a room or zone being conditioned; separate flexible curtain means pivotally connected at one edge to each of said certain walls and responsive to upstream pressure variations for progressively varying the effectiveness of said fluid passage means; linkage means connected to the other edges of said separate curtain means, a presettable coil spring connected to said linkage for maintaining said separate curtain means in a predetermined position relatively to its corresponding certain wall to provide a predetermined effectiveness of the fluid passage means therein; and a prestressed leaf spring extending between the connections of said linkage and said other edges of said separate curtain means, said leaf spring having a lower spring constant than said coil spring.

References Cited in the file of this patent

UNITED STATES PATENTS

| | | |
|---|---|---|
| 1,623,431 | McVoy | Apr. 5, 1927 |
| 2,744,748 | Weiger et al. | May 8, 1956 |
| 2,772,086 | Foster | Nov. 27, 1956 |
| 2,890,716 | Werder | June 16, 1959 |

FOREIGN PATENTS

| | | |
|---|---|---|
| 445,799 | France | Sept. 13, 1912 |